United States Patent Office 3,790,505
Patented Feb. 5, 1974

3,790,505
LOW TEMPERATURE METHANOL
SYNTHESIS CATALYST
Thomas D. Casey, Fern Creek, and George M. Chapman, Louisville, Ky., assignors to Catalysts and Chemicals, Inc., Louisville, Ky.
No Drawing. Continuation-in-part of abandoned application Ser. No. 787,234, Dec. 26, 1968. This application May 4, 1971, Ser. No. 140,244
Int. Cl. B01j 11/22
U.S. Cl. 252—463
12 Claims

ABSTRACT OF THE DISCLOSURE

Until recently low temperature methanol synthesis catalysts have been virtually unknown. A zinc, copper and chromium catalyst has been used as a low temperature methanol synthesis catalyst, but alumina has been discounted as having no practical interest as an ingredient in a methanol synthesis catalyst. However, under certain conditions alumina can be used to advantage in such catalysts.

BACKGROUND OF THE INVENTION

This application is a continuation-in-part of application Sea. No. 787,234, filed Dec. 26, 1968, now abandoned.

This invention relates to the production of methanol and particularly to catalysts for the process.

On an industrial scale methanol is generally prepared by the reaction of oxides of carbon with hydrogen. It has been the practice to react carbon monoxide or carbon dioxide with hydrogen using copper or rare earth metal catalysts and temperatures in the range of 570° F. to 750° F. Mixed catalysts containing zinc have also been very successfully used in methanol synthesis. For instance combinations of zinc and chromium have long been considered among the better methanol catalysts.

Because of equilibrium values, when the reaction of the carbon oxide and hydrogen is conducted at a temperature of 570° F. to 750° F., it is necessary to carry out the reaction at high pressures in order to obtain suitable yields. Thus at these tempertaures and 200 atmospheres the product contains only 2.4 percent methanol. At 300 atmospheres this yield is about doubled. In addition higher temperatures and pressures appear to favor the formation of higher molecular weight oxygenated hydrocarbons. In fact with a zinc oxide-chromium oxide catalyst it is possible to obtain high purity methanol only at process temperatures below about 735° F. Side reactions increase when the process is carried out above this temperature. Nevertheless until recently low temperature methanol synthesis catalysts have been virtually unknown.

If the methanol synthesis reaction is carried out at what are considered to be low temperature conditions for the process, that is 400° F. to 560° F., there is a resulting approach to more favorable equilibrium conditions. However many high temperature methanol catalysts possess such low activities at low temperatures that they cannot be employed in the lower temperature reactions. Other high temperature methanol synthesis catalysts exhibit good initial activities but have very poor catalyst lives. Hence most high temperature methanol synthesis catalysts cannot be used in low temperature synthesis processes.

An excellent treatment of the synthesis of methanol under high temperature conditions appears in Catalysis, vol. III, Emmett, Reinhold, 1955. In this treatise G. Natta reviews the work which has been done with various catalysis, particularly zinc oxide, copper oxide, and chromium oxide, concluding that catalysts of industrial importance for synthesis of methanol are composed of mixtures of two or more oxides such as zinc oxide and chromium oxide, zinc oxide and magnesium oxide, or zinc oxide and copper oxide. Natta points out that whereas zinc, copper and chromium are considered very active for the synthesis of methanol these catalysts have poor resistance to aging and are highly sensitive to poisons. Such catalysts can, however, be used as low temperature methanol catalysts as shown in U.S. 3,326,956.

SUMMARY OF THE INVENTION

In accordance with the practice of this invention it has been found that catalysts can be made which are particularly resistant to loss of activity, and which also have the necessary strength properties. Compositions which can be reduced to form low temperature methanol synthesis catalytsts having particularly long lives can be made with copper oxide, zinc oxide, and alumina mixture if the compositions are prepared by a procedure contemplated herein. The weight ratio of zinc oxide to copper oxide, based on metals, is one-half zinc to one copper up to three zinc to one copper, and the dried, i.e., unreduced, compositions contain 5 to 45 percent $Al_2O_3$ which confers increased thermal stability on the finished catalyst and leads to the formation of a pure product.

DETAILED DESCRIPTION OF THE INVENTION

In his discussion of ternary methanol synthesis catalysts Natta observed that alumina favors the dehydration reaction of methanol to give dimethyl ether. Therefore zinc oxide and alumina catalysts are said to have no practical interest. In view of these teachings it would appear that catalysts containing zinc oxide, copper oxide and alumina would also be ineffective low temperature methanol synthesis catalysts, and this proved to be the case. However, according to this invention, if prepared by adherence to certain desiderata, an extremely effective low temperature methanol synthesis catalyst can be made containing zinc, copper and alumina which retains its activity and strength properties sufficiently long to be effective commerically for the process.

Considering now these desiderata, it is important that the zinc oxide and the copper oxide each be made from the carbonate. The zinc and copper carbonates can be made by precipitating soluble zinc and copper salts with an alkali metal carbonate, for instance by the addition of zinc and copper nitrates to a sodium carbonate solution. Desirably the carbonates, i.e., compounds composed of carbonate and hydroxides commonly called basic carbonates, can be concomitantly precipitated by the addition of a solution containing a mixture of the soluble zinc and copper salts, say the nitrates, in the proper zinc to copper ratio to a sodium or other alkali metal carbonate solution. Preferably the zinc and copper carbonates are made from the soluble copper and zinc tetra ammine carbonates. However di and tri ammine carbonates can also be made. The zinc or the copper ammine complex is then heated for a period of time sufficient, at a temperature in the range of 160° F. to 210° F., to liberate ammonia and unreacted carbon dioxide, forming the water insoluble basic carbonates. When this method is used, it is also preferred to form the zinc and copper carbonates as a mixture by concomitant precipitation, the aqueous solution of the mixture of copper and zinc ammine complexes being heated to form the carbonate precipitate. After the copper and zinc carbonate suspension are formed, whether separately, mixed, or concomitantly precipitated, the water is eliminated. The carbonates are then dried. The carbonates themselves are not mixed with alumina and then converted to the oxides. Rather it is necessary that the carbonates be heated to form the oxides before mixing with alumina.

Perhaps the most important facet of the preparation of the catalysts contemplated herein is that of the mixing of the zinc and copper oxides with the alumina.

More than mere mixing is involved since neither dry mixing nor wet mixing using ball mill produces a suitable catalyst. However, if (a) an aqueous suspension of the alumina is formed first, and (b) the copper and zinc oxides are completely mixed with the alumina in this medium an effective low temperature methanol synthesis catalyst results. The zinc and copper oxides are incorporated in the suspension using a sufficiently large quantity of water so that the resulting or final suspension of the zinc oxide, copper oxide and alumina contains no more than 20 percent solids, i.e. no more than 20 percent by weight of the three oxides.

A desirable catalyst results when the aqueous suspension is first formed, and dry copper oxide and zinc oxide, as decomposition products of carbonates are completely mixed into the alumina suspension. Nevertheless the catalyst is further improved if a slurry of the zinc and copper oxides is also formed. This suspension of the zinc and copper oxides is then combined with suspension of alumina, the water employed in making each suspension being an amount such that the final suspension contains no less than 80 percent water.

It has been pointed out that the final suspension of copper oxide, zinc oxide, and alumina is mixed completely, i.e. it is agitated sufficiently so that the dispersed oxides do not settle in two hours. The catalyst can be still further improved if the final suspension is homogenized, that is subjected to shearing force to form a homogenous dispersion, an extremely effective low temperature methanol synthesis catalyst can be made. It is possible that the shearing action improves the catalyst by generating new catalyst surfaces, apparently then creating, through chemisorption, a polar condition which leads to coupling during calcination. Methods of high shear mixing are well known, the shearing force being applied by rotary blades, discs, or paddles for instance in Eastern Cowles, Waring and Hockmeyer mixers. If homogenized, the shearing forces will form oxides having an average particle size smaller than 1 micron, usually an average particle size of about 0.2 to 0.3 micron. The properties of mixtures with a solids level appreciably above 20 percent render them difficult to homogenize without generating excessive heat, tending to lower the activity of the catalyst.

After either turbine mixing or homogenization the catalyst is dried and formed into the desired pellets. It will also be reduced prior to use. The reduction is best, effected with a dilute hydrogen or carbon monoxide stream under mild conditions, so controlled that there is no rapid temperature rise. Preferably the temperature should stay above 300° F., but it should not rise above 650° F. The formation of the catalyst of this invention can perhaps best be understood from specific preparations.

EXAMPLE 1

To 4450 grams of a zinc nitrate solution (9.0% Zn by weight) were added 1320 grams of cupric nitrate solution (15.2% Cu by weight). This solution of zinc and copper nitrates was added to sufficient sodium carbonate solution at 140° F. to precipitate the zinc and copper. The resulting green cake of zinc and copper basic carbonates was filtered, washed, dried and calcined (650° F. to 750° F.) to form a mixture of zinc oxide and copper oxide. In a Waring blender 320 parts by weight of alumina trihydrate in 1920 parts of water by weight were intimately mixed with 480 parts by weight of the mixture of zinc and copper oxides in 1920 parts of water under homogenization conditions for 15 to 20 minutes. This mixture was then dried to tabletting moisture, tabletted and calcined (650° F. to 750° F.).

EXAMPLE 2

To 1880 ml. (12.02 gm. Zn/100 ml. soln.) of zinc tetra ammine carbonate dissolved in 3582 ml. of water 1038 ml. (10.6 gm. Cu/100 ml. soln.) of copper tetra ammine carbonate were stirred in until dissolved. To bring about the decomposition of the ammine carbonates and precipitate copper and zinc carbonates, the solution was heated (160° F. to 195° F.) 4.5 hours. The resulting precipitate of copper and zinc basic carbonates was then filtered, washed, dried and calcined (650° F. to 700° F.) to form a mixture of zinc oxide and copper oxide. 198 grams of zinc and copper oxides thus prepared were added to 152 gm. by weight of alumina trihydrate along with 39 gm. by weight of alumina monohydrate (in a 23.6 percent by weight slurry of alumina monohydrate) in 300 gm. of water. In a Waring blender the three oxides were intimately mixed under homogenization conditions for 15 to 20 minutes. This mixture was then dried to tabletting moisture, tabletted and calcined (650° to 750° F.). The resulting composition had a surface area of 191 m.$^2$/gm.

EXAMPLE 3

Following Example 2 a catalyst precursor was made using 1240 ml. (21.5 gm. Zn/100 ml. soln.) of zinc tetra ammine carbonate dissolved in 6470 gm. of water and combined with 2300 ml. (5.8 gm. Cu/100 ml. soln.) of copper tetra ammine carbonate. After conversion to the oxides, the resulting oxides were added to 523 gm. of alumina trihydrate in 3794 gm. of water. After homogenization and tabletting the resulting composition had a surface area of 137 m.$^2$/gm. and a density of 67.1 lbs./ft.$^3$.

EXAMPLE 4

Following Example 2 a catalyst precursor was made by combining a solution of 2580 gm. (10.4 gm. Zn/100 ml. soln.) of zinc tetra ammine carbonate dissolved with 1320 ml. (10 gm. Cu/100 soln.) by weight of copper tetra ammine carbonate. After conversion to the oxides, the oxides formed were added to 134.6 gm. by weight of alumina trihydrate in 276 parts of water by weight. The composition was then homogenized, dried and tabletted. The final composition had a density of 68.6 pounds per cubic foot.

EXAMPLE 5

The process of Example 3 when operated on a continuous basis resulted in a catalyst precursor having a surface area of 170 m.$^2$/gm. and a density of 56.6 lbs./ft.$^3$.

EXAMPLE 6

Following the procedure of Example 1, and using the same quantities of ingredients, copper oxide and zinc oxide were prepared. Rather than using a Waring blender the 320 parts by weight of alumina trihydrate were subjected to the shearing forces of a turbine mixer with 1920 parts by weight of water for 15 minutes. A similar suspension was prepared with the zinc and copper oxides and 1920 parts by weight of water. The two suspensions were then combined and shear mixed for one-half hour in a turbine mixer.

EXAMPLE 7

A catalyst was made following Example 6 except that the copper and zinc oxides were made by the procedure of Example 2. The quantities of reactants employed were those used in Example 2.

EXAMPLE 8

A catalyst was made following Example 7 except that all of the water was mixed with the alumina trihydrate, and the copper oxide and zinc oxide were added to this suspension in their dry states.

In Table A are given results of activity and stability tests run with the foregoing compositions after they were reduced with a CO, $CO_2$, and $H_2$ gas mix and heat removal means to keep the temperature below 500° F. The activities of these catalysts are reported in terms of yields. Since methanol yields are usually reported as cubic centimeters of methanol per cubic centimeter of catalyst per hour such units will be employed herein. High temperature methanol processes yield about 1 cc. $CH_3OH$/cc. cat./hr. As can be seen in Table A our yields with the catalysts of this invention are 3 to 4 cc. $CH_3OH$/cc. cat./hr. For the sake of uniformity all catalysts were tested, and these yields obtained under the same conditions. All runs were carried out at a temperature of 750° F., a pressure of 2,000 p.s.i.g. and a space velocity of 20,000 vol. gas/vol. cat./hr. The catalysts produce a crude methanol containing a lower concentration of impurities than that produced with conventional high temperature catalysts. In all instances where the yield is 3 cc. $CH_3OH$/cc. cat./hr. or higher the purity is above 90 percent, i.e., the crude product contains at least 90 percent methanol.

TABLE A

| Example | Percent | | | Yield, cc. $CH_3OH$/cc. cat./hr. |
|---|---|---|---|---|
| | Copper oxide | Zinc oxide | Aluminum oxide | |
| 1 | 23.2 | 46.5 | 30.2 | 3.2 |
| 2 | 19.8 | 40.2 | 40.0 | 3.4 |
| 3 | 18.6 | 37.2 | 44.3 | 3.8 |
| 4 | 28.0 | 57.1 | 14.9 | 3.00 |
| 6 | 23.2 | 46.5 | 30.2 | 3.3 |
| 7 | 19.8 | 40.2 | 40.0 | 3.5 |

The foregoing data in Table A show that compositions are provided herein which on reduction are excellent low temperature methanol catalysts. So long as they are precipitated as carbonates any source of copper and zinc can be utilized. If the tetra ammine carbonate method is employed copper and zinc metal can be used. If an alkali metal carbonate is used with soluble salts of copper and zinc, any of the known common soluble salts can be used, preferably, the nitrate salts. The aluminas contemplated herein are any of the commercially available catalytic aluminas. By catalytic alumina is meant the variety of transitional aluminas which are available for catalysts. Transitional aluminas are metastable forms which, in general, are produced by the heating of alpha or beta alumina trihydrates or monohydrates. As each of these starting materials, or any mixture thereof, is heated, phase changes take place. A number of intermediate or transitional alumina phases are formed. These are characterized by being only partially or poorly crystalline. They are partly amorphous and partly crystalline. In the overall transition of alpha and beta alumina, several different transitional aluminas result. The names assigned to the various transitional aluminas are gamma, delta, eta, theta, kappa, chi and rho. The alpha monohydrate itself is, in a sense, a transitional alumina since it is a product reversibly obtained on heating either alpha or beta alumina trihydrate under suitable conditions of temperature and time. In addition to these transitional forms described above, there is a truly amorphous alumina characterized by having no definite X-ray diffraction pattern. Upon heating, its structure can also be converted to other forms of transitional alumina. This invention thus contemplates transitional aluminas activated by calcining or otherwise heating with steam or air, etc. to raise the surface area to above 50 square meters per gram, preferably in the range of 200 to 400 square meters per gram. Alumina devoid of water of hydration can be used in any of these preparations, but the hydrate is preferred because of the tabletting characteristics of the powder containing the alumina hydrate. A non-hydrated alumina such as commercially available activated alumina or other calcined alumina will cause tool wear and lead to a more costly operation.

It has been emphasized hereinbefore that if the aqueous suspension of the three oxides contains more than 20 percent solids a poor catalyst results. This is illustrated by the data in Table B, the catalysts having been made following Example 2.

TABLE B

Low temperature $CH_3OH$ at P=2,000 p.s.i.g., T=475° F., S.V.=20,000

| Zn:Cu | Percent | | Cc.$CH_3OH$/ cc.cat./hr. | Percent purity |
|---|---|---|---|---|
| | Aluminum oxide | Solids | | |
| 2:1 | 30.2 | 10 | 3.40 | 91.5 |
| 1:1 | 30.2 | 20 | 3.46 | 94.4 |
| 2:1 | 30.1 | 40 | 0.46 | 83.0 |

As noted hereinbefore it is necessary either to completely mix or to homogenize a suspension of the oxides in order to produce an effective methanol synthesis catalyst. This is illustrated in Table C wherein various methods of mixing are demonstrated. In each case the catalyst contains zinc and copper in a ratio of two to one and about 30 percent alumina prior to reduction. The preparations set forth in the table are as follows: A, a catalyst made by the use of tetra ammines; B, a catalyst made by the addition of copper and zinc nitrates to sodium carbonate; C and D, preparations made as in A but with a different mixing procedure set forth in the table; and E, made as was D but completely mixed rather than homogenized.

TABLE C

| Catalyst | Method of mixing | Yield, cc. $CH_3OH$/cc. cat./hr. |
|---|---|---|
| A | Homogenization | 3.4 |
| B | Dry mixing (ball mill) | 1.6 |
| C | Wet mixing (ball mill) | 2.9 |
| D | Homogenization | 3.7 |
| E | Complete mixing of slurry | 3.5 |

The effect of the method of mixing the copper and zinc oxides with the alumina is clearly apparent from the yields which were obtained with the reduced composition.

The thermostability conferred on our catalysts by the alumina will be appreciated from the fact that a catalyst of the invention initially producing methanol under our test conditions in a yield of 3.4 cc. of methanol per cc. catalyst per hour was still producing 3.2 cc. methanol per cc. catalyst per hour after 345 hours. The thrmostability of a methanol catalyst is probably best demonstrated by subjecting the catalyst to varying and extreme operating conditions. The catalyst of the invention was prepared by homogenization and run for a period of a month, being operated at temperatures of 475° F., 525° F., 550° F., 575° F., and 625° F. for various periods of at least one day during the month. At the end of the month the catlyst was tested again under our standard testing conditions.

TABLE D

| Catalyst | Percent activity loss |
|---|---|
| No $Al_2O_3$ | 18.9 |
| 20% $Al_2O_3$ | 9.4 |

As can be seen from Table D the catalyst with alumina exhibits improved thermostability relative to the catalyst without alumina. In addition alumina does not harm the composition as stated by Emmett since the product of the catalyst at the end of one month on stream on analysis contained above 90 percent methanol, most of the by product being water.

Considering now other variables, a preferred catalyst composition contains thirty percent alumina and a zinc to copper ratio of two to one. However the thermostability of the catalyst increased with the quantity of alumina up to forty-five percent. These considerations are set forth on Table E wherein percentages of alumina and zinc-copper ratios are compared, the same test conditions being used, and the catalyst being one that was made by homogenization.

TABLE E

| Zn/Cu: | Percent alumina (wt.) | Yield |
| --- | --- | --- |
| 1:1 | 30 | 3.4 |
| 1.5:1 | 30 | 3.1 |
| 2:1 | 14.9 | 3.0 |
| 2:1 | 30 | 3.3 |
| 2:1 | 32.4 | 3.0 |
| 2:1 | 40 | 3.8 |
| 2:1 | 45 | 2.8 |
| 3:1 | 30 | 3.0 |

It can be seen that the zinc to copper ratio does not greatly affect the yield. However a ratio by weight of one zinc to one copper to 2 zinc to 1 copper is preferred. It can also be seen that the yield begins to drop off at about 45 weight percent alumina. A quantity of alumina in the range of 20 to 40 weight percent is preferred.

To further illustrate the advantages of forming the alumina slurry and then mixing the zinc and copper oxides therewith we shall now compare various methods of preparing the catalyst. First, however, two considerations must be emphasized. A methanol synthesis catalyst may exhibit a high initial activity, but the activity may rapidly drop off. Hence in comparing such catalysts it is necessary to look at retention of activity as well as the initial activity. Second as shown by two of the catalysts, those made by 3,303,001 and 3,388,972 all good low temperature shift catalysts are not good low temperature methanol synthesis catalysts. Each catalyst in Table F was prepared following either an example herein or an example of an issued patent. The patent numbers and example numbers are set forth in the table.

TABLE F

| Catalyst prepared by— | Yield, cc. CH₃OH/ cc. cat./hr. | Activity loss (percent of initial activity lost) |
| --- | --- | --- |
| Ex. 5 of 3,303,001 | 2.8 | 61% in 24 hours. |
| Ex. 3 of 3,388,972 | 2.9 | 43% in 120 hours. |
| Ex. 1 of 2,334,100 | 2.1 | Initial activity too low for life test. |
| Ex. 2 herein | 3.4 | 11% in 27 hours. |
| Ex. 3 herein | 3.8 | 19% in 227 hours. |

It can be seen that unless the catalyst is made by the process of this invention either its initial activity is too low or it loses its activity too quickly. The catalyst of 3,303,001 had fair initial activity but the catalyst will not hold up. This was also true of a catalyst made by 3,388,972 but using an ammine process. Both of these catalysts are excellent shift catalysts. It is obvious, therefore, that a shift catalyst may be or may not be a good low temperature methanol synthesis catalyst.

Since this methanol process is carried out under the known low temperature conditions of 400° F. to 560° F. operating variables need not be discussed at length herein. Suffice it to say that within this temperature range the particular temperature seems to have little effect on catalyst performance. The methanol yield increases quite rapidly with pressure at a given space velocity. Hence pressures above atmospheric are preferred, say 750 p.s.i.g. to 2,000 p.s.i.g. Space velocities will be in the range of 100 to 20,000. Referring now to the gas feed, for the process of the invention a ratio of carbon monoxide to carbon dioxide of 0.5:1 to 20:1 is desirable. Preferably the gas will be free of sulfur compounds and will contain hydrogen from a stoichiometric amount up to five times that quantity. Various changes in the process will occur to those skilled in the art, particularly the optimum carbon monoxide-carbon dioxide ratio. It will also occur to those in this field that small amounts of other ingredients such as chromium can be included in the composition. We have successfully used chromium in amounts suggested in 3,326,965.

What is claimed is:

1. A low temperature methanol synthesis catalyst composition comprising the oxides of zinc, copper and aluminum and suitable, upon reduction to synthesize methanol by the reaction of carbon monoxide or carbon dioxide or mixtures thereof with hydrogen, said catalyst composition comprising:
    (A) a mixture of zinc and copper aluminum oxides in a weight ratio of 0.5 zinc: 1 copper to 3 zinc: 1 copper and in which the aluminum oxide constitutes from about 5 to 45 percent by weight of the total composition, the steps of preparing said catalyst composition comprising:
        (1) forming an aqueous metal oxide mixture, comprising the oxides of zinc, copper and aluminum, the total metal oxides comprising not more than twenty percent by weight of said aqueous mixture,
        (2) agitating said aqueous metal oxide mixture and subjecting same to high speed shearing forces to form an aqueous dispersion of finely comminuted metal oxides,
        (3) drying, tableting and calcining said oxides.

2. The catalyst of claim 1 wherein the zinc to copper weight ratio is 1:1 to 2:1.

3. The catalyst of claim 1 wherein the quantity of alumina is 20 to 40 weight percent.

4. The catalyst of claim 1 wherein the zinc to copper weight ratio is 1 to 1 and the quantity of alumina is 30 percent.

5. The catalyst of claim 1 wherein the zinc to copper weight ratio is 2:1 and the quantity of alumina is 40 percent.

6. A method of preparing a low temperature methanol synthesis catalyst suitable, upon reduction to synthesize methanol by the reaction of carbon monoxide or carbon dioxide or mixture thereof in the range of 400° F. to 560° F. which comprises the steps of:
    (A) forming an aqueous metal oxide mixture comprising the oxides of zinc, copper and aluminum in a weight ratio in the range of 0.5 zinc: 1 copper to 3 zinc: 1 copper and in which the oxide of aluminum comprises 5 to 45 weight percent of the total metal oxides, the metal oxides comprising not more than twenty percent by weight of said aqueous mixture,
    (B) agitating said aqueous metal oxide mixture and subjecting same to high speed shearing forces to form an aqueous dispersion of finely comminuted metal oxides,
    (C) drying, tableting and calcining said oxides.

7. A method of preparing a catalyst as defined in claim 6, the further step in which the oxides of zinc and copper are derived by thermal decomposition of zinc and copper carbonates.

8. A method of preparing a catalyst as defined in claim 6, the further step of forming an aqueous metal oxide mixture which comprises:
    (A) mixing aluminum oxide with water to form a finely divided dispersion of aluminum oxide and water,
    (B) mixing a mixture of copper oxide and zinc oxide with water to form a finely divided dispersion of zinc and copper oxides in an aqueous medium; and,
    (C) mixing the two aqueous dispersions of A and B together and subjecting same to high speed shearing forces to form a finely divided dispersion of the three metal oxides.

9. A method of preparing a catalyst, as defined in claim 6, wherein the zinc to copper weight ratio is 1:1 to 2:1.

10. A method of preparing a catalyst as defined in claim 6, wherein the quantity of aluminum oxide is 20 to 40 percent by weight of the total oxide mixture.

11. A method of preparing a catalyst, as defined in claim 6, wherein the zinc to copper weight ratio is 1:1 and the aluminum oxide comprises 30 percent by weight of the total metal oxide mixture.

12. A method of preparing a catalyst, as defined in claim 6, wherein the zinc to copper weight ratio is 2:1 and the quantity of aluminum oxide is 40% by weight of the total oxide mixture.

References Cited
UNITED STATES PATENTS

| | | | |
|---|---|---|---|
| 2,334,100 | 11/1943 | Patieff et al. | 260—668 R |
| 3,388,972 | 6/1968 | Reitmeier et al. | 252—463 X |
| 3,303,001 | 2/1967 | Dienes | 252—463 X |
| 3,546,140 | 12/1970 | Gutmann et al. | 252—463 X |

DANIEL E. WYMAN, Primary Examiner

W. J. SHINE, Assistant Examiner

U.S. Cl. X.R.

252—475, 476